United States Patent [19]

Melen

[11] Patent Number: 5,325,167

[45] Date of Patent: Jun. 28, 1994

[54] RECORD DOCUMENT AUTHENTICATION BY MICROSCOPIC GRAIN STRUCTURE AND METHOD

[75] Inventor: Roger D. Melen, Los Altos Hills, Calif.

[73] Assignee: Canon Research Center America, Inc., Calif.

[21] Appl. No.: 881,065

[22] Filed: May 11, 1992

[51] Int. Cl.$^5$ .......................... G06K 7/10; G06K 9/74; G06K 19/06; G07D 7/00

[52] U.S. Cl. ...................................... 356/71; 235/380; 235/468; 235/494; 340/825.34

[58] Field of Search .................. 356/71; 235/380, 382, 235/468, 469, 494; 340/825.34

[56] References Cited

U.S. PATENT DOCUMENTS

4,423,415  12/1983  Goldman ............................. 235/382
4,547,896  10/1985  Ohtombe et al. ...................... 356/71
4,675,669   6/1987  Goldman ........................ 340/825.34

Primary Examiner—Robert J. Warden
Assistant Examiner—L. M. Crawford
Attorney, Agent, or Firm—Paul Hentzel

[57] ABSTRACT

Record document may be authenticated against reference grain data obtained from the document at a prior time. The body of the document is formed by base medium bearing the record entries such as text within record site. Grain seal site is located at a predetermined location within the base medium. The unique grain structure within the seal site are microscopic and function as a seal for authenticating the document. The seal site is initially scanned to provide a stream of reference data generated by the surface reflection of the grain structure. This reference grain data is stored in memory for future authentication use. The seal site is then currently scanned to generate a stream of current grain data for comparison to the reference grain data.

39 Claims, 6 Drawing Sheets

GENERAL METHOD OF FIGURE 3

I) INITIALLY SCANNING
    the grain structure

REMOVE Steady Component

DETERMINING Standard Deviation

SD FILTERING Initial Data

LOW PASS Frequency Filtering

II) ENTERING the Stream
    of Initial Data Pixels

III) SUBSEQUENTLY SCANNING
    the grain structure

REMOVE Steady Component

DETERMINING Standard Deviation

SD FILTERING Subsequent Data

LOW PASS Frequency Filtering

IV) ENTERING the Stream
    of Subsequent Data Pixels

V) COMPARING Initial Data
    to Subsequent Data

DETERMINING Correlation Coefficient

PRE-EXISTING METHOD OF FIGURE 5

PROVIDE Base Medium
       with toner seal     PRINT Record Entries     INITIALLY SCANNING
       the record entry and the seal     ENTERING the Initial Data
       into an On-Document
       or Off-Document Memory     SUBSEQUENTLY SCANNING
       the seal     ENTERING the Subsequent Data     COMPARING Initial Data to Subsequent Data

Fig 4

SEAL GENERATION METHOD OF FIGURE 7

PROVIDE Base Medium

PRINT Record Entries
       and Seal     INITIALLY SCANNING
       the record entry and the seal

ENTERING the Initial Data
       into an On-Document
       or Off-Document Memory

SUBSEQUENTLY SCANNING
       the seal     ENTERING the Subsequent Data     COMPARING Initial Data to Subsequent Data

Fig 6

RECORD DOCUMENT AUTHENTICATION BY MICROSCOPIC GRAIN STRUCTURE AND METHOD

TECHNICAL FIELD

This invention relates to authentication of record documents, and more particularly to such authentication based on a unique microscopic grain structure of each document.

BACKGROUND

Heretofore, authentication of documents relied primarily on various seal devices and on the examination of original signatures. These basic authentication techniques prevented an electrostatic copy of record document from passing as the original document. However, seals may be cleverly altered, transferred to other documents or counterfeited; and experienced forgers can produce high quality forgeries of signatures which are difficult to detect even by qualified handwriting experts.

These prior seal and signature safeguards did not involve any unique quality of the underlying paper. Nor were seals and signatures typically employed on every sheet of a lengthy document.

Unique surface texture has been employed to authenticate hotel room keys against unauthorized duplicates, as taught in U.S. Pat. No. 4,677,435 issued on Jun. 30, 1987 to D'Agraives et al. The surface texture in a predetermined seal area on the room key was initially scanned and stored in a central computer with an initial texture databank at the front desk. Each time the quest inserts his key to enter his room, a small scanning device in the door lock rescans the seal area and transmits the new texture data immediately to the central databank. If the new texture data compares with the initial data, the door can be opened by the quest. If the new data does not compare, an override lock controlled by the central computers prevents entry.

Conductive fibers have been randomly distributed throughout a document to produce a unique conductive pattern, as taught in U.S. Pat. No. 4,820,912 issued on Apr. 11, 1989 to Roeselare. The fiber pattern was scanned by microwave energy to establish initial reference data which was later compared to subsequent data for authentification.

The unique translucency pattern of a paper tag (or identification card) has been employed to authenticate the tag, as taught in U.S. Pat. No. 4,423,415 issued on Dec. 27, 1983 (and U.S. Pat. No. 4,476,468 issued on Oct. 9, 1984) to Goldman. The initial translucency data from a tag seal area was magnetically stored on an "escort" memory carried on the paper tag. Later the seal was rescanned and the new translucency data was compared to the magnetic initial data.

SUMMARY

It is therefore an object of this invention to provide record bearing documents which may be authenticated by scanning unique grain structure intimately associated with the underlying document.

It is another object of this invention to provide a method of authenticating such record bearing documents.

It is a further object of this invention to provide such a document and method wherein the authenticating unique grain structure is the grain structure inherent in the document plus the grain structure deposited on the document.

It is a further object of this invention to provide such a document and method wherein the authenticating unique grain structure is grain structure deposited on the document.

It is further object of this invention to provide a method of authenticating such record bearing documents involving filtering out high amplitude signals generated during scanning of the unique grain structure.

It is further object of this invention to provide a method of authenticating such record bearing documents involving filtering out high frequency signals generated during scanning of the unique grain structure.

Briefly, these and other objects of the present invention are accomplished by providing a document bearing record entries, and which may be currently authenticated against reference grain data obtained from the document during a reference scan made at a prior time. A base medium forming the body of the document has a grain seal site at a predetermined location therein. Unique microscopic grain structure within the seal site may be currently scanned to provide current grain data for comparison to the reference grain data. The major steps of the general method are summarized below.

Initially scanning the grain structure within the grain seal site on the document with an initial scanning device at an initial time to form a stream of initial data pixels in response to the grain structure.

Entering the initial data pixels into an initial storage memory.

Subsequently scanning the grain structure within the grain seal site on the document with a subsequent scanning device at a subsequent time to form a stream of subsequent data pixels in response to the grain structure.

Entering the subsequent data pixels into a subsequent storage memory.

Comparing the initial data pixels to the subsequent data pixels to determine if a grain correlation exits indicating that the subsequently scanned document is the same document as the initially scanned document.

BRIEF DESCRIPTION OF THE DRAWING

Further objects and advantages of the record document and method of authenticating will become apparent from the following detailed description and drawing (not drawn to scale) in which.

The elements of the invention are designated by two digit reference numerals in the above Figures. The first digit indicates the Figure in which that element is primarily described. The second digit indicates related features and structures within each Figure. The letter indicates a sub-portion or feature of that element.

GENERAL EMBODIMENT OF RECORD DOCUMENT (FIG. 1A)

Figures 1A, 1B:
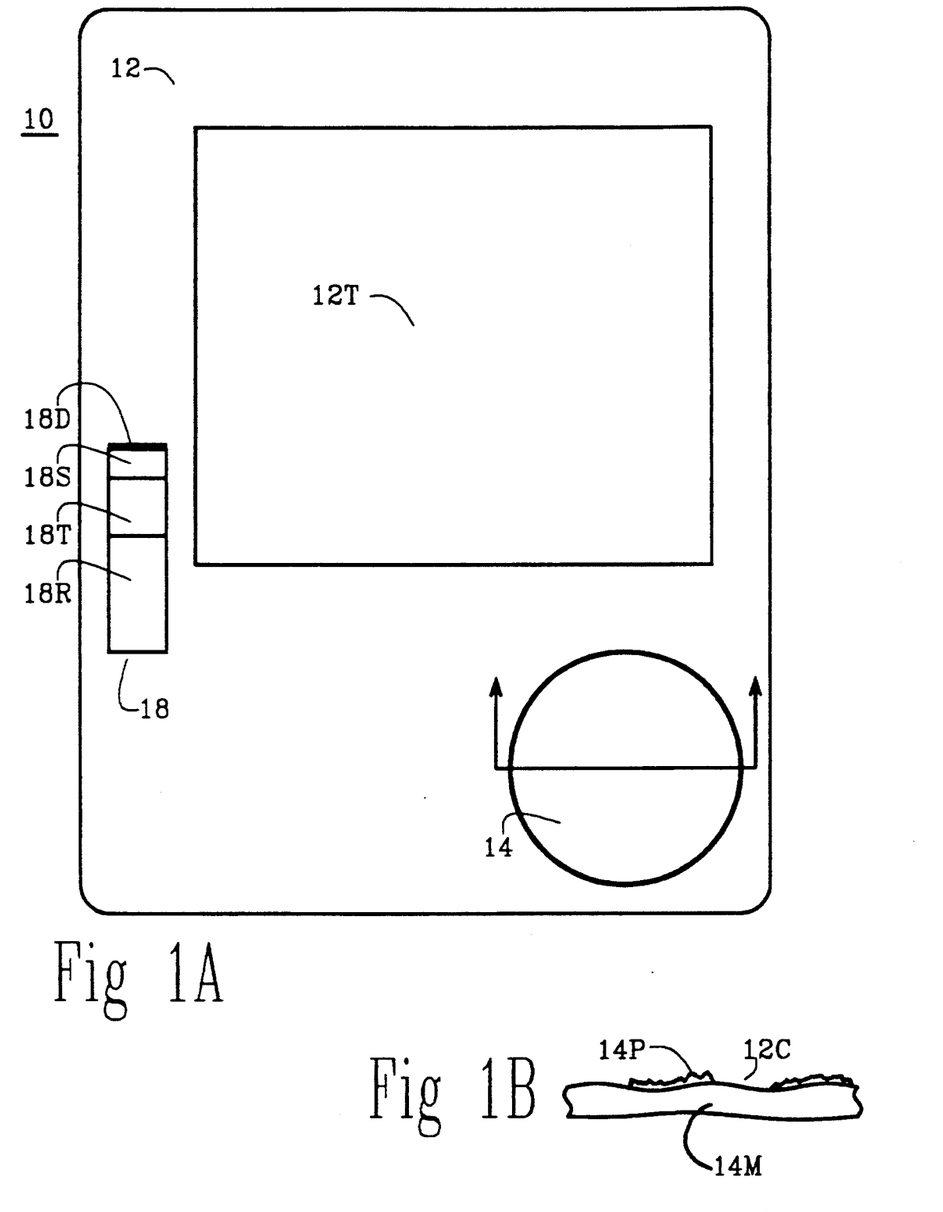
FIG. 1A is a plan view of a record bearing document 10 containing a seal site 14 and a companion data site 18.
FIG. 1B is a sectional view of a portion of a seal site showing an broken layer 14P of deposited grain structure partially covering the sea site.

Record document 10 may be currently authenticated against reference grain data obtained from the document at a prior time. The body of the document is formed by base medium 12 which may be any suitable sheet like material such as ordinary paper capable of bearing the record entries such as text within record site 12T. Grain seal site 14 is located at a predetermined location within the base medium. The unique grain structure within the seal site functions as the seal for authenticating the document. The seal site is initially scanned at a prior time to provide a stream of reference data generated by the surface reflection of the grain structure. This reference grain data is stored in memory for future authentication use. The seal site is then currently scanned to generate a stream of current grain data for comparison to the reference grain data.

The size of the individual grains forming the grain structure within the seal site are preferable microscopic. That is so small as to be invisible or indistinct to the unaided eye, yet large enough to detectable by a scanner. The small grain size places the individual grains beyond the copying capacity of xerographic copiers. Conventional electrostatic charge transfer imaging techniques can image and copy the large overall features of the grain seal, but cannot reproduce the unique grain structure of the seal on a toner particle by toner particle basis. Bandwidth limitations inherent in the imaging lenses limit the spatial resolving power of the optical system. High resolution is additionally limited by charge leakage across the photosensitive imaging drum during the image process.

Figure 1C:
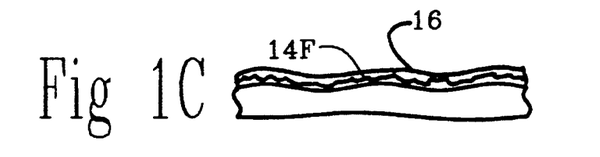
FIG. 1C is a sectional view of a portion of a seal site showing an opaque layer 14F of deposited grain structure fully covering the seal site.

GRAIN STRUCTURE (FIG. 1B and 1C)

The unique grain structure may include inherent grain 14M integrally formed in the base medium during the manufacturing process, and deposited grain 14P and 14F formed on the base medium after manufacture (see FIG. 1B and 1C). The inherent grain structure is randomly distributed throughout the base medium. Each small area of each sheet of the base medium has a unique grain structure or "finger print" which ma be used to identify that particular sheet. Microscopic surface properties such as paper roughness and color hues, affect the surface reflectivity causing reflection diffusion of the incident scanning light. In the reflection mode, scanning light is reflected from a scanning lamp to scanning detectors positioned on the same side of the document.

The deposited grain structure may be formed of any suitable pigmented substance, ink, or marking agent for providing differential reflection characteristics, such as toner particles bonded to the base medium. The toner particles may be deposited onto the base medium using any suitable deposition technique such as contact printing (stamping or lithographic printing), impact printing using full character embossing dyes with a ink ribbon or a partial character dot matrix device, charge transfer imaging using electrostatic forces for ink particle transfer and retention, or ink jet printing using propelled ink droplets.

Carbon based toner particles provide black grain structure. Other colors of pigment may be employed. Red grain structure within the seal site provides a red background color which is the traditional color for seals. A toner mixture of multiple colors of toner (C colors) may be employed with a corresponding C color scanner system to enhance the correlation coefficient between the reference data and the current data. The C color scanner may have C photo responsive devices, one sensitive to each of the C colors. Alternatively, the C color scanner may employ broad band photo devices with narrow band filters.

Grain seal site 14 may be any shape. The grain seal site shown in the embodiment of FIG. 1 is generally round which is traditional for seals. The grain seal site may be the shape of a symbol, such as the logo mark of the owner of the document.

The toner particles may be deposited in sufficient amounts to fully cover the grain seal site forming a thick opaque layer 14F of toner particles (see FIG. 1C) without any exposed base medium within the grain seal site. The opaque embodiment is limited to the reflection mode. The opaque layer does not provide any transmitted light, and the inherent grain structure within the base medium does not contribute to the seal. The seal grain structure is primarily formed by the surface reflection properties of the opaque toner layer. Large surface effects of the opaque layer 14F such as surface roughness provides a relatively large dimension element of the grain structure which produces a corresponding high amplitude component in the scanning data streams. Small surface effects of the opaque layer 14F such as crystal facets of individual toner crystals provides a smaller dimension element of the grain structure which produces a corresponding low amplitude component in the scanning data streams.

The toner particles may be deposited sparsely in amounts sufficient only to partially cover the grain seal site forming a thin broken layer 14P of toner particles (see FIG. 1B). The broken layer has a network of small cells 12C of exposed base medium visible between the random clusters of toner particles within the grain seal site. In the broken layer embodiment the seal grain structure has three elements:

1) the toner grain structure of deposited toner 14P,
2) the inherent grain structure of exposed cells 12C, and
3) the high contrast between the exposed inherent grain structure and the dark toner grain structure.

Figure 2:
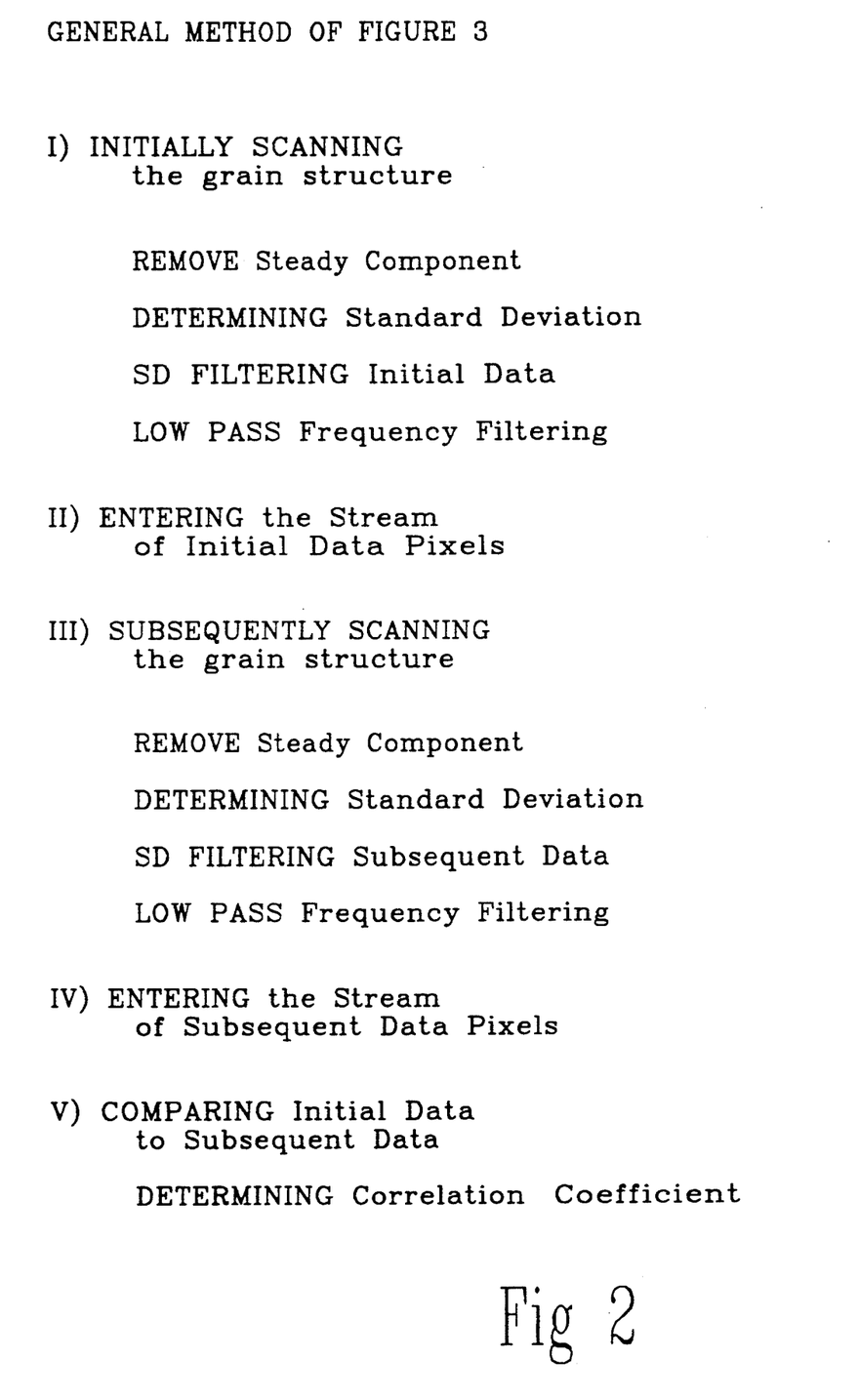
FIG. 2 shows the steps of the general method of authenticating a document using unique grain structure.

The high amplitude signal associated with the exposed cells may be filtered out (see FIG. 2).

A similar high contrast is present along the edge of opaque characters. The fuzzy edge of the deposited ink produces an interface network of white cells and black particles. In addition, isolated black particles are present in the white area along the edge of the ink deposit and isolated white cells form in the black ink. Peripheral splatter caused by ink jet droplets produce a "halo" of ink particles on the paper around each character.

ENVIRONMENTAL BARRIER 16

The grain seal site may have a suitable covering such as barrier film 16 (see FIG. 1 C) for protecting the grain structure from adverse chemical effects of the environment and from physical wear due to handling the record documents. The barrier may be any suitable lacquer or spray material with an index of refraction similar to air (or whatever gas is present during the scanning of the grain structure). Alternatively, the toner may contain a sealant material which forms a protective cover over each toner particle in the grain seal site.

DIGITAL DATA SITE 18

The document may have a suitable companion memory thereon such as digital data site 18 positioned within the base member for containing various digital data concerning the record document. The companion data site is an integral part of the document and is always available for data retrieval. Any digital format may be employed such as the "E of L Data Format" disclosed in pending U.S. patent application entitled DATA FORMAT FOR RECORDING DIGITAL DATA AND METHOD by Dirk Hughes-Hartogs, Ser. No. 807,227, filed Dec. 16, 1991, and assigned to the present assignee.

The reference grain data obtained during the prior scan may be stored in digital form within sub region 18R of the digital data site. The digital data site may contain additional digital data in sub region 18 concerning the parameters defining the conditions of the prior scan, such as the prior time date of the scan and the identification of the scanner employed. Smaller sub region 18D may contain the identification number of the record document. The text and or graphics of the record entries carried by the document may be contained in digital data codes in sub region 18T of the digital data site.

The companion digital data site may have any size and shape. The size of the data site is dependent on the amount of data stored and the storage density employed. Digital data site 18 and grain seal site 14 may be located on the same side of the document as record entry site 12T (as shown in FIG. 1) or on the opposite side.

Figure 3:
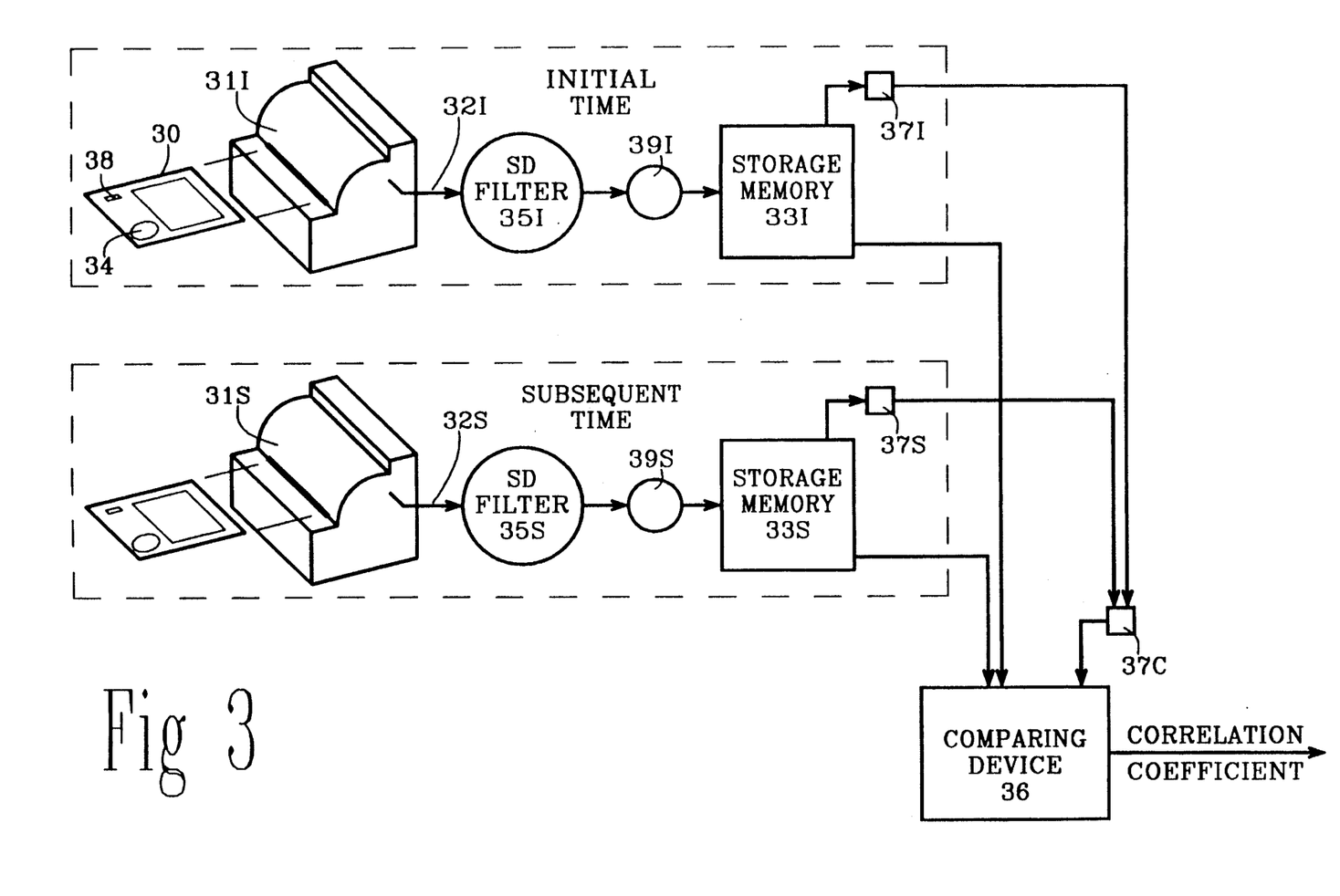
FIG. 3 is a schematic view of the apparatus employed in the general method of FIG. 2.

GENERAL METHOD—(FIGS. 2 and 3)

Record document 30 (see FIG. 3) may be authenticated by comparing reference grain data obtained from seal site 34 at a prior time against current grain data obtained at the end of the authentification period. The general method of authenticating is based on the stability and uniqueness of the microscopic grain structure within the grain seal site of the document. The major steps of the general method are shown as steps I, II, III, IV and V in FIG. 2, and are summarized below. The apparatus for performing the method is shown schematically in FIG. 3.

I) INITIALLY SCANNING the grain structure within the grain seal site on the document with initial scanning device 31I at a prior (initial) time. The initial scanner may be any suitable handheld or mounted scanning device such as an optical scanner for responding to the analog grain data within seal site 34, and presenting initial data pixels 32I for storage in initial storage memory 33I. The X-Y center of the scan data may be determined using 1st moment techniques. The X and Y midpoints define the center the scan data, and is a convenient reproducible point for center alignment of the data from each scan. In addition, the scan data may be skew corrected using 2nd moment techniques to provide a reproducible primary axis for orientation alignment.

ENTERING the stream of initial data pixels into initial storage memory 33I for storage until the document is authenticated. The initial storage memory may be an on-document companion memory formed by digital data site 38, or any off-document long term storage mechanism suitable for receiving, storing and retrieving digital data such as hard disks, floppy disks and magnetic tapes.

SUBSEQUENTLY SCANNING the grain structure within the grain seal site on the document with subsequent scanning device 31S at a subsequent time to form a stream of subsequent data pixels 32S in response to the grain structure. The X-Y centering and skew correction insure that the subsequent scan data is aligned the same as the initial scan data.

ENTERING the stream of subsequent data pixels int subsequent storage memory 33S.

COMPARING the initial data pixels to the subsequent data pixels in comparing device 36 to determine if a grain correlation exits indicating that the initially scanned document is the same document as the subsequently scanned document. The correlation coefficient (CC) may be any suitable ratio for indicating the extent of matching between the initial pixels and the subsequent pixels, such as the ratio of the number (M) of matched pixels over the total number (T) of pixels compared. The matching function employed to define whether a match exists may be any suitable function including functions from the class of summation correlation functions and from the class of Cauchy-Swhartz inequality functions.

The initially scanning step and the subsequently scanning step of the reflection mode embodiment have the additional steps of, providing a source of scanning photons, reflecting the scanning photons off of the grain structure within the grain seal site, and detecting the reflected scanning photons to provide stream of initial data and the stream of subsequent data.

STANDARD DEVIATION FILTERING (FIG. 2)

The seal site may have macroscopic features therein in addition to the unique microscopic grain structure. These macroscopic features may include temporary extrinsic matter deposited on the document such as particulate dust or fingerprints; and may include permanent intrinsic conditions such as toner voids, scratches, or blemishes in the base medium of the document. These macroscopic features have dimensions sufficient to permit reproducing on state of the art electro-photographic copiers. That is they "pass through" ordinary office copiers, and therefore have minimum authentification value. An authentification based on macroscopic features would show a high correlation between the original document and any electro-photographic facsimile thereof. The macroscopic features may be filtered out of the initial data stream and the subsequent data stream using any suitable amplitude filtering technique which passes the low amplitude grain structure signals but blocks out the high amplitude macroscopic features.

Standard deviation (SD) filtering may be employed for eliminating these high amplitude outliers which deviate more than a predetermined number (N) of standard deviations from the mean. In an embodiment employing N=3 standard deviations, only 1% of the pixels will have high amplitude outlier status, and the remaining 99% will pass into storage memory. The steps of the standard deviation (SD) filtering method are shown as indented steps under major steps I and III in FIG. 2, and are summarized below. Initial SD filter 35I and subsequent SD filter 35S (see FIG. 3) receive the data pixels from the scanners and temporarily store the pixels in active memory within the SD filters.

DETERMINING THE STANDARD DEVIATION of the variation of each individual pixel in the initial data stream with reference to the mean value of all of the data pixels.

FILTERING THE INITIAL DATA stream before the comparing step by filtering out the outlier signals in the initial data stream which exceed the predetermined Nth standard deviation. This SD filtering step eliminates large variations corresponding to the macroscopic features present in the seal site at the prior initial time.

DETERMINING THE STANDARD DEVIATION of each pixel in the subsequent data stream with reference to the mean value.

FILTERING THE SUBSEQUENT DATA stream before the comparing step by filtering out signals in the subsequent data stream which exceed the predetermined Nth standard deviation. This SD filtering step eliminating large variations corresponding to the macroscopic features in the seal site at the subsequent time.

The initial residue resulting from the initial SD filtering step may not be identical to the subsequent residue resulting from the subsequent SD filtering step. Temporary extrinsic matter present during the initial scan may not be present on the scan seal site after the authentication period, or extrinsic matter may be displaced from the initial position. Additional extrinsic matter may have been deposited during the authentification period. All of the permanent intrinsic conditions present at the initial scan will normally survive the authentification period, and will be SD filtered from both data streams. However, the subsequent data stream may contain additional mars (dents, holes, folds etc.) which were not present at the initial scan. The effect of the temporary extrinsic matter may be reduced by removing loose matter from the grain seal site prior to the initial scanning step and again prior to the subsequent scanning step.

The outliers may be "tagged" and eliminated from consideration in the correlation coefficient determination by maintaining an outlier bit map (or outlier address table). Initial outlier bit map 37I is combined with subsequent outlier bit map 37S for providing complete outlier bit map 37C. The presence of an outlier pixel in either outlier bit map prevents that pixel in the storage memory plus the corresponding pixel in the other storage memory from affecting the correlation coefficient. Alternatively, the outlier pixels may simply be "neutralized" by setting the pixel value to the mean value. These statistically "grounded" pixels then have negligible effect on the correlation coefficient.

In the embodiment of FIGS. 2 and 3, the SD filtering is done immediately after the scanning step. In which case, initial SD filter 35I may not be the same filter as the subsequent SD filter 35S. However, both filtering steps may be performed at the subsequent time, just prior to the comparing step as the data pixels are being retrieved from storage memory. The same SD filter unit may then be used for both steps, insuring that the filter parameters are identical for both data streams.

VARIABLE SIGNAL COMPONENT

Only the variable (time dependent) component of the pixel data streams has useful information about the microscopic grain structure. The steady (time constant) component merely reflects non grain effects of the scanning such a the darkening of the paper through age, background lighting intensity of the scanning lamps, and bias levels in the photo-detector circuitry. During the scanning steps only the variable component of the initial data stream and the subsequent data stream need be scanned into the stream of initial data pixels and the stream of subsequent data pixels. The steady component may be removed from the data streams by a variety of techniques including simple subtraction within the scanner device. During the entering steps only the variable component need be entered into the initial storage memory and subsequent storage memory. During the comparing step only the variable components need be compared.

LOSS-PASS FILTERING (FIGS. 2 and 3)

The very high frequency component of the data streams is primarily unwanted mechanical noise introduced by scanner tremors and minor misalignment between the scanner and the seal site. A source of long term noise involves the individual crystal facets of the toner particles. The toner oxidizes slowly over the years causing slight changes in the shape and dimensions of the crystals. The toner exhibits an additional slight deformation due to the very slow plastic flow of the toner layer. These noise factors may be eliminated from the data streams by filtering out the very high frequencies through initial low pass filter 39I and subsequent low pass filter 39S. Therefore, the method of authentication may include the following low pass filtering steps (see FIG. 2).

LOW PASS FILTERING the stream of initial data pixels prior to entering into the initial storage memory to eliminate signal components above a predetermined pass frequency.

LOW PASS FILTERING the stream of subsequent data pixels prior to entering into the subsequent storage memory to eliminate signal components above a predetermined pass frequency.

Filtering of the data streams through low pass filters 39I and 39S also reduces the bandwidth and time required for the comparing step.

Removing the very high frequency component prior to storage minimizes the needed storage space within the initial storage memory and the subsequent storage memory. Alternatively, the raw data streams may be stored in memory in unfiltered form, and low pass filtered just prior to the comparing step. In this late filtering embodiment, both data streams may be filtered by the same filter under the same conditions.

Figure 4:
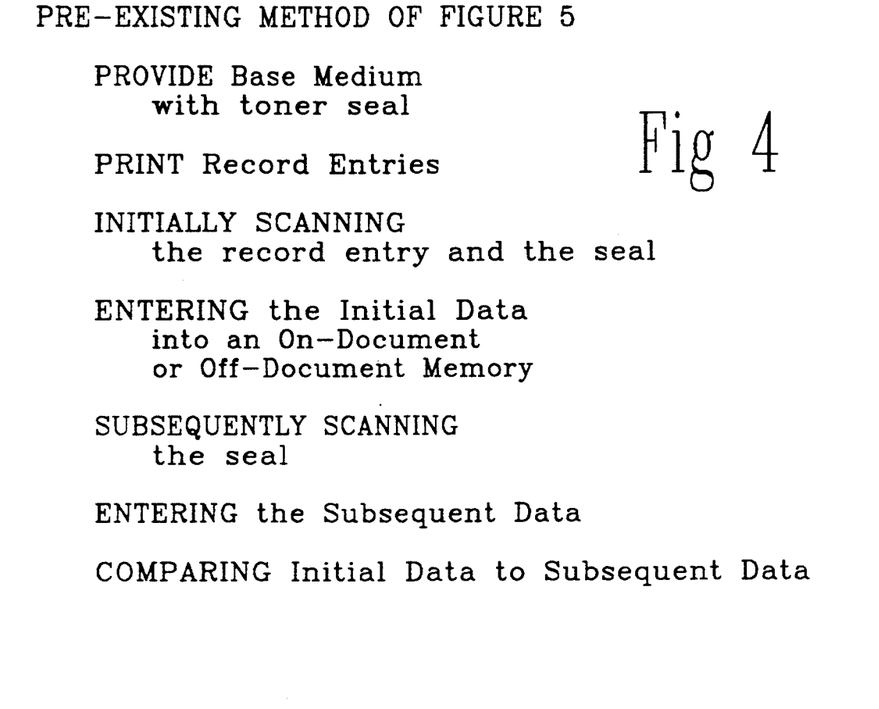
FIG. 4 shows the steps of a specific method of authenticating a document using pre-existing seal.
Figure 5:
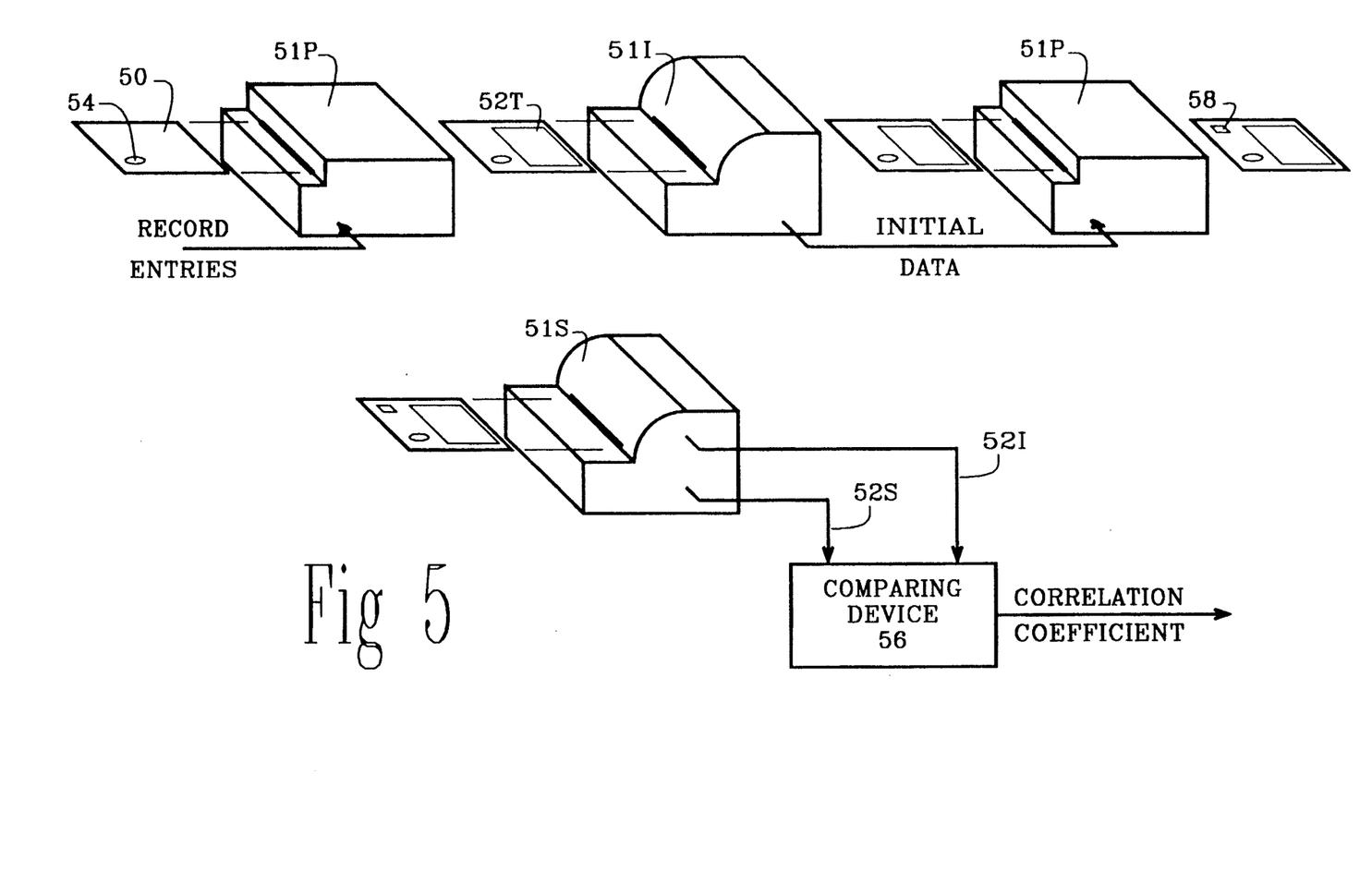
FIG. 5 is a schematic view of the apparatus employed in the pre-existing seal method of FIG. 4.

PRE-EXISTING SEAL EMBODIMENT (FIGS. 4 and 5)

In the pre-existing seal embodiment, the manufacturer of the base medium provides paper 50 (see FIG. 5) already toned with grain structure with pre-existing seal site 54 along with margin numbers and margin lines. The method steps of the pre-existing seal embodiment are shown in FIG. 4, and the apparatus is shown in FIG. 5. The user at the work station employs printer 51P to print record entries onto record site 52T of the paper, and initial scanner 51I to scan the grain structure within the seal site. The storage memory for receiving the initial data stream of seal site data may be an off-document storage memory, or an on-document companion memory formed by the digital data site 58 on the base medium as shown in FIG. 5. In the on-document embodiment, the initial data from the seal site is entered on the on-document memory in digital format by printer 51P. During the step of initially scanning, the record entries may also scanned and converted into digital data, and during the entering step both the seal site data and the record entries data are entered into the storage memory. An on-document memory embodiment may employ an off-document memory as a back-up memory. Later when the document is to be authenticated, both seal site 54 and data site 58 are scanned by subsequent scanner 51S producing twin data streams 52I and 52S into comparing device 56. Initial data 52I is scanned form digital data site 58 and subsequent data 52S is scanned from seal site 54.

Figure 6:
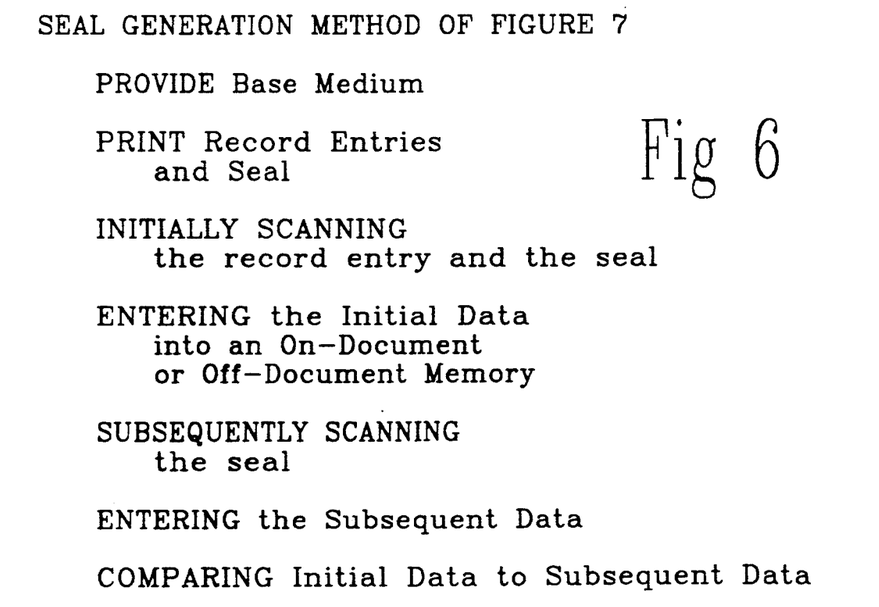
FIG. 6 shows the steps of a specific method of authenticating a document using a user generated seal.
Figure 7:
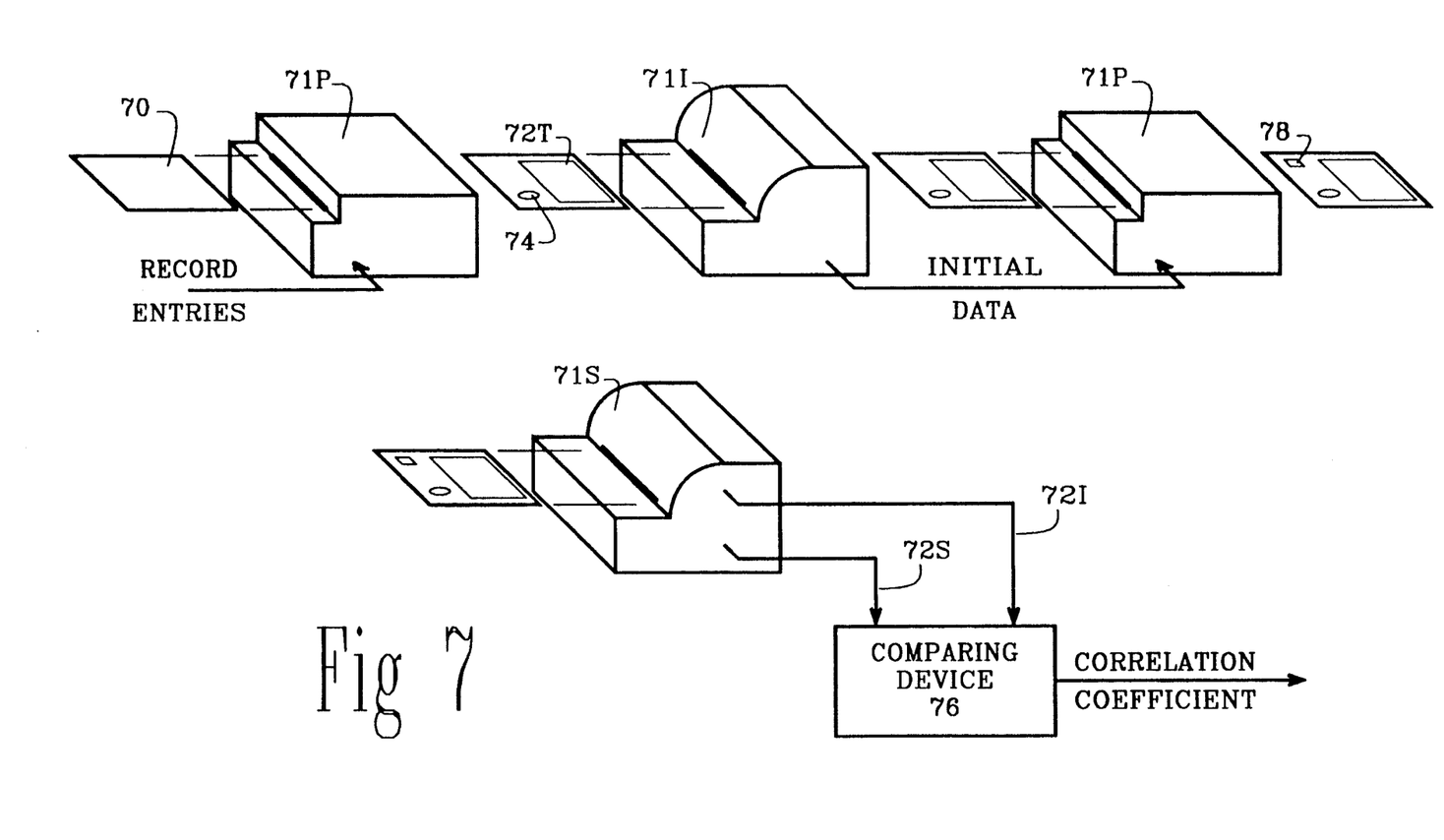
FIG. 7 is a schematic view of the apparatus employed in the user generated seal method of FIG. 6.

SEAL GENERATION EMBODIMENT (FIGS. 6 and 7)

In the seal generation embodiment, the seal is created by the user at the work station using printer. The manufacturer of the base medium paper provides paper 70 (see FIG. 7) without a pre-existing seal site. The method steps of the seal generation embodiment are shown in FIG. 6, and the apparatus is shown in FIG. 7. The user at the work station employs printer 71P to print record entries 72T and seal site 74 onto the paper. Initial scanner 71I to scans the grain structure within the seal site. The storage memory for receiving the initial data stream of seal site data may be an off-document storage memory, or an on-document companion memory. In the on-document embodiment, the initial data from the seal site is entered on the on-document companion memory 78 by printer 71P. During the step of initially scanning, the record entries may also scanned and converted into digital data, and during the entering step both the seal site data and the record entries data are entered into the storage memory. Later when the document is to be authenticated, both seal site 74 and companion data site 78 are scanned by subsequent scanner 71S producing twin data streams 72I and 72S into comparing device 76.

SCANNER RESOLUTION

The resolution of the seal site scanner may be selected from a range of resolutions extending from a low resolution just above the copier pass through level to a high resolution just below the upper frequency limitation of the low pass filters. Grain data having a resolution lower than the pass through resolution offers little protection against counterfeit documents produced on office copiers. In general, high resolution scanning of the seal site will provide a higher sample population (data base) resulting in a correlation coefficient having a greater power of discrimination. That is, a high resolution scan of a fixed area seal site will provide more seal security than the a low resolution scan.

The resolution of the digital data site scanner may also very depending on the data density required by the digital paper storage medium. In the high density embodiment with a corresponding high resolution scanner, the reference grain data, the scan parameter data, and the text (or graphic) data may all be contained in a small patch in the corner of the document or within a small strip along an edge. Lower resolution scanning will require a proportionately larger digital data site. However the low density data will be less sensitive to data loss and noise. A single scanner may be employed for both the seal site and the companion data site if the security requirements and the digital data density requirements are compatible. The site scanners may also be employed to scan the text entries for OCR purposes in order to convert the entries into digital data codes. The OCR population sample may be decimated to a lower resolution to conserve space in sub region 18T of digital memory 18.

COVERT SEALS

The presence of the seal site on the document may not be apparent to the user or counterfeiter. Covert seals have two major advantages over visible seals. First, the counterfeiter will not know that a security seal system is in effect; in which case his falsifying efforts will easily be detected. Second, even if the counterfeiter is aware of the seal system; he will not know the location of the seal within the document.

A covert toner seal may be provided by the toned area within the logo or other large symbols printed in the letterhead or elsewhere on the document. The entire symbol (or a predetermined portion thereof) is designated as the seal site, and the unique microscopic deposited grain within the site is scanned and stored as the reference data. The document looks the same as an non-seal document without a clue as to the existence or location of the seal site. Alternatively, the toner forming the stroke width of the text of the record entries may be employed as the seal grain in a high resolution embodiment.

CONCLUSION

It will be apparent to those skilled in the art that the objects of this invention have been achieved as described hereinbefore. Clearly various changes may be made in the structure and embodiments shown herein without departing from the concept of the invention. Further, features of the embodiments shown in the various Figures may be employed with the embodiments of the other Figures. Therefore, the scope of the invention is to be determined by the terminology of the following claims and the legal equivalents thereof.

I claim as my invention:

1. A document bearing record entries, which document may be currently authenticated against reference grain data obtained from the document during a reference scan made at a prior timer, comprising:
   base medium forming the document;
   grain seal site having a visible shape at a predetermined location within the base medium;
   unique microscopic grain structure formed by opaque toner particles having reflective facets deposited on the surface of the base medium after manufacture thereof and bonded to the base medium within the seal site, which grain structure may be scanned to provide current grain data for comparison to reference grain data obtained from the document during a reference scan made at a prior time.

2. The document of claim 1, wherein the visible shape of the grain seal site formed by the deposited toner grain structure is round.

3. The document of claim 1, wherein the visible shape of the grain seal site formed by the deposited toner is a symbol.

4. The document of claim 1, wherein the toner particles contain a sealant material which forms a protective cover over each of the individual toner particles in the grain seal site.

5. The document of claim 4, wherein the sealing material forms a sealing film over the grain seal site for protecting the grain seal site.

6. The document of claim 1, wherein the toner particles are deposited in amounts sufficient to fully cover the grain seal site forming an opaque layer of toner particles without any exposed base medium within the grain seal site.

7. The document of claim 1, wherein the toner particles are deposited in amounts sufficient only to partially cover the grain seal site forming broken a layer of toner particles with regions of exposed base medium within the grain seal site.

8. The document of claim 7, wherein the unique grain structure is formed by the optical contrast between toner grain structure provided by the deposited toner and exposed inherent grain structure provided by the regions of exposed base medium within the grain seal site.

9. The document of claim 1, wherein the base medium has a record side containing record entries, and an opposite side thereto, and the grain seal site is on the surface of the record side of the base medium along with the record entries.

10. The document of claim 1, wherein the base medium has a record side containing record entries, and an opposite side thereto, and the grain seal site is on the surface of the opposite side of the base medium from the record entries.

11. The document of claim 1, wherein wherein the base medium has a record side containing record entries, and an opposite side thereto, and a digital data site on the surface of the record side of the base medium along with the record entries.

12. The document of claim 1, wherein the base medium has a record side containing record entries, and an opposite side thereto, and a digital data site on the surface of the opposite side of the base medium from the record entries.

13. A method of authenticating a document bearing record entries, comprising the steps of:
providing a document bearing record entries having a unique microscopic grain structure thereon formed by opaque toner particles having reflective facets deposited on the surface of the document and bonded to the document within a grain seal site on the document;
initially scanning the unique microscopic grain structure within the grain seal site on the document with an initial scanning means at an initial time to form a stream of initial data pixels in response to the unique microscopic grain structure;
entering the initial data pixels into an initial memory means;
subsequently scanning the unique microscopic grain structure within the grain seal site on the document with a subsequent scanning means at a subsequent time to form a stream of subsequent data pixels in response to the grain structure;
entering the subsequent data pixels into a subsequent memory means;
comparing the initial data pixels to the subsequent data pixels to determine if a grain correlation exits indicating that the subsequently scanned document is the same document as the initially scanned document.

14. The method of claim 13, wherein the seal site has macroscopic features therein in addition to the microscopic grain structure.

15. The method of claim 14, further comprising the additional step of:
filtering the subsequent data pixels before the comparing step to eliminate large variations therein corresponding to the macroscopic features in the seal site at the subsequent time.

16. The method of claim 15, further comprising the additional step of:
filtering the initial data pixels before the comparing step to eliminate large variations therein corresponding to the macroscopic features in the seal site at the initial time.

17. The method of claim 16, wherein the filtering step is standard deviation filtering further comprising the steps of:
determining the standard deviation of the variations in the initial data and in the subsequent data;
removing any signals in the initial data and in the subsequent data which exceed a predetermined Nth standard deviation.

18. The method of claim 17, wherein $N=3$.

19. The method of claim 13, wherein the initial data and the subsequent data each have a variable component and a steady component, and during the comparing step only the variable component of the initial data and the variable component of the subsequent data are compared.

20. The method of claim 19, wherein during the entering steps only the variable component of the initial data and the subsequent data are entered into the memory means.

21. The method of claim 20, wherein during the scanning steps only the variable component of the initial data and the subsequent data are scanned into the stream of initial data and the stream of subsequent data.

22. The method of claim 13, further comprising the additional steps of:
low pass filtering the stream of initial data prior to entering into the initial memory to eliminate signal components above a predetermined pass frequency; and
low pass filtering the stream of subsequent data prior to entering into the subsequent memory to eliminate signal components above a predetermined pass frequency.

23. The method of claim 13, comprising the additional step of depositing toner particles on the document within the grain seal site prior to the providing a document step and the initially scanning step to provide microscopic grain structure.

24. The method of claim 23, wherein the document has a record side containing record entries, and an opposite side thereto, and the grain seal site is on the opposite side of the document from the record entries.

25. The method of claim 23, comprising the additional steps of:
retrieving the initial data from the initial memory means; and
printing the retrieved initial data in digital form onto the document.

26. The method of claim 25, wherein the toner particles are deposited on the document within the grain seal site during the printing of the record entries onto the document.

27. The method of claim 13, wherein the initially scanning step and the subsequently scanning step each comprise the additional steps of:
providing a source of scanning photons;
reflecting the scanning photons off of the grain structure within the grain seal site; and detecting the reflected scanning photons to provide stream of initial data and the stream of subsequent data.

28. The method of claim 13, further comprising the step of:
determining a correlation coefficient after the comparison step indicating the extent of matching between the initial data and the subsequent data wherein the correlation coefficient CC is:

CC=M/T where
M is the number of matched pixels, and
T is the total number of pixels compared.

29. A method of authenticating a document bearing record entries and having pre-existing unique microscopic grain structure within a seal site, comprising:
providing a base medium forming a document with toner particles deposited thereon defining a seal site with a unique microscopic grain structure formed by opaque toner particles having reflective facets deposited on the surface of the base medium and bonded to the base medium;
printing record entries onto the base medium;
initially scanning the grain structure within the seal site on the base medium to form an initial data stream of seal site data in response to the grain structure;
entering the initial data stream of seal site data into an initial memory means;
subsequently scanning the grain structure within the seal site on the document to form a subsequent data stream of seal site data in response to the grain structure;
entering the subsequent data stream of seal site data into a subsequent memory means;
comparing the initial seal site data to the subsequent seal site data to determine if a grain correlation exits indicating that the initially scanned document is the same document as the subsequently scanned document.

30. The method of claim 29, wherein the initial memory means for receiving the initial data stream of seal site data is an off-document memory.

31. The method of claim 29, wherein the initial memory means for receiving the initial data stream of seal site data is an on-document companion memory formed by a digital data site on the base medium.

32. The method of claim 29, wherein the initial memory means for receiving the initial data stream of seal site data is an off-document memory and also an on-document companion memory formed by a digital data site on the base medium.

33. The method of claim 29, wherein the during the step of initially scanning, the record entries are also scanned and converted into digital data, and during the entering the initial data stream step both the seal site data and the record entries data are entered into the initial memory means.

34. A method of authenticating document bearing record entries by generating unique microscopic grain structure within a seal site, comprising:
providing a base medium forming a document;
printing record entries onto the base medium;
depositing opaque toner particles having reflective facets on the surface of the base medium and bonding the toner particles to the base medium within a seal site for providing a unique microscopic grain structure;
initially scanning the grain structure within the seal site on the base medium to form an initial data stream of seal site data in response to the grain structure;
entering the initial data stream of seal site data into an initial memory means;
subsequently scanning the grain structure within the seal site on the document to form a subsequent data stream of seal site data in response to the grain structure;
entering the subsequent data stream of seal site data into a subsequent memory means;
comparing the initial seal site data to the subsequent seal site data to determine if a grain correlation exits indicating that the initially scanned document is the same document as the subsequently scanned document.

35. The method of claim 34, wherein the step of printing the record entries and the step of depositing the toner particles are a single step.

36. The method of claim 34, wherein the initial memory means for receiving the initial data stream of seal site data is an off-document memory.

37. The method of claim 34, wherein the initial memory means for receiving the initial data stream of seal site data is an on-document companion memory formed by a digital data site on the base medium.

38. The method of claim 34, wherein the initial memory means for receiving the initial data stream of seal site data is an off-document memory and also an on-document companion memory formed by a digital data site on the base medium.

39. The method of claim 34, wherein the during the step of initially scanning, the record entries are also scanned and converted into digital data, and during the step of entering the initial data stream both the seal site data and the record entries data are entered into the initial memory means.

* * * * *